United States Patent
Hatano

(10) Patent No.: US 12,145,341 B2
(45) Date of Patent: Nov. 19, 2024

(54) METHOD FOR PRODUCING PNEUMATIC TIRES, TIRE MOLD, AND PNEUMATIC TIRES

(71) Applicant: The Yokohama Rubber Co., LTD., Tokyo (JP)

(72) Inventor: Atsuya Hatano, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 848 days.

(21) Appl. No.: 16/606,181

(22) PCT Filed: Apr. 18, 2018

(86) PCT No.: PCT/JP2018/015973
§ 371 (c)(1),
(2) Date: Oct. 17, 2019

(87) PCT Pub. No.: WO2018/194081
PCT Pub. Date: Oct. 25, 2018

(65) Prior Publication Data
US 2020/0130310 A1    Apr. 30, 2020

(30) Foreign Application Priority Data
Apr. 20, 2017   (JP) ................................ 2017-083562

(51) Int. Cl.
*B29D 30/72* (2006.01)
*B29C 33/42* (2006.01)
(Continued)

(52) U.S. Cl.
CPC ............ *B29D 30/72* (2013.01); *B29C 33/42* (2013.01); *B29C 33/428* (2013.01);
(Continued)

(58) Field of Classification Search
CPC ............ B29D 30/72; B29D 2030/0618; B29D 2030/726; B29D 30/0606;
(Continued)

(56) References Cited

U.S. PATENT DOCUMENTS 5,984,256 A * 11/1999 Endo ....................... B28B 1/525
249/134
2002/0024158 A1 * 2/2002 Nishigaki .............. B29D 11/00
264/2.5
(Continued)

FOREIGN PATENT DOCUMENTS

| CN | 104023962 | 9/2014 |
| CN | 105473319 | 4/2016 |

(Continued)

OTHER PUBLICATIONS

ESpaceNet Translation of JPH0596914 (Year: 2022).*
(Continued)

*Primary Examiner* — Emmanuel S Luk
*Assistant Examiner* — Elisa H Vera
(74) *Attorney, Agent, or Firm* — Thorpe North & Western

(57) ABSTRACT

In manufacturing a pneumatic tire, a replaceable member having a smooth flat surface is attached to a mold body of a tire mold configured to vulcanize an unvulcanized tire into a predetermined shape by contact with the unvulcanized tire. A mold inner surface that forms the shape of a tire side surface portion includes a curved surface of the mold body and the flat surface surrounded by the curved surface. A vulcanized tire is produced by vulcanizing the unvulcanized tire by bringing the unvulcanized tire into contact with the mold inner surface. A two-dimensional code is engraved in a planar surface region of the vulcanized tire, which corresponds to the flat surface. In the two-dimensional code, a dot pattern is formed by two types of gray scale elements that (Continued)

are formed identifiable from each other by surface unevenness.

17 Claims, 5 Drawing Sheets

(51) Int. Cl.
  *B29D 30/06* (2006.01)
  *B60C 13/00* (2006.01)
(52) U.S. Cl.
  CPC ........ *B29D 30/0606* (2013.01); *B60C 13/001* (2013.01); *B29D 2030/0612* (2013.01); *B29D 2030/726* (2013.01)
(58) Field of Classification Search
  CPC ............ B29D 2030/0612; B29D 30/06; B29D 30/0681; B60C 13/001; B60C 13/00
  See application file for complete search history.

(56) References Cited

U.S. PATENT DOCUMENTS

| | | | |
|---|---|---|---|
| 2004/0032053 A1* | 2/2004 | Parmelee | B29D 30/72 264/293 |
| 2006/0151451 A1* | 7/2006 | Smith, Jr. | B29D 30/0061 219/121.68 |
| 2008/0283169 A1* | 11/2008 | Sato | B60C 13/001 152/450 |
| 2013/0099419 A1* | 4/2013 | Sehm | B29D 30/0629 425/46 |
| 2014/0048193 A1 | 2/2014 | Yukawa | |
| 2015/0013869 A1 | 1/2015 | Yukawa | |
| 2015/0298408 A1 | 10/2015 | Fukumoto | |
| 2016/0167328 A1* | 6/2016 | Villeneuve | B60C 13/001 425/28.1 |
| 2017/0008243 A1* | 1/2017 | Oshima | B29D 30/0606 |
| 2017/0011666 A1* | 1/2017 | Kraus | G09F 3/0297 |
| 2017/0050473 A1 | 2/2017 | Muhlhoff et al. | |
| 2017/0080656 A1* | 3/2017 | Muhlhoff | B29D 30/0606 |

FOREIGN PATENT DOCUMENTS

| | | |
|---|---|---|
| CN | 106457711 | 2/2017 |
| DE | 10 2008 010 486 A1 | 9/2008 |
| JP | H01-120309 | 5/1989 |
| JP | H05-096914 | 4/1993 |
| JP | H10-086615 | 4/1998 |
| JP | 2013-173458 | 9/2013 |
| JP | 2014-037214 | 2/2014 |
| WO | WO 2005/000714 | 1/2005 |
| WO | WO 2013/108464 | 7/2013 |
| WO | WO 2013/129351 | 9/2013 |
| WO | WO 2015/019137 | 2/2015 |
| WO | WO 2015/118155 | 8/2015 |
| WO | WO 2015/165862 | 11/2015 |
| WO | WO 2015/165863 | 11/2015 |
| WO | WO 2016/185043 | 11/2016 |
| WO | WO 2017/174920 | 10/2017 |

OTHER PUBLICATIONS

Merriam-Webster, Flat, retrieved Jan. 13, 2023, url: https://www.merriam-webster.com/dictionary/flat (Year: 2023).*
International Search Report for International Application No. PCT/JP2018/015973 dated Jun. 19, 2018, 6 pages, Japan.

* cited by examiner

METHOD FOR PRODUCING PNEUMATIC TIRES, TIRE MOLD, AND PNEUMATIC TIRES

TECHNICAL FIELD

The present technology relates to a method for manufacturing a pneumatic tire, a tire mold, and a pneumatic tire. Specifically, the present technology relates to a method for manufacturing a pneumatic tire including a two-dimensional code on a tire side surface portion, a tire mold, and a pneumatic tire.

BACKGROUND ART

In the related art, a two-dimensional code has been recently provided on a tire side surface portion of a known tire. Since the two-dimensional code can contain more information than a one-dimensional code, various information is included in the two-dimensional code and thus the tire can be managed. In particular, a two-dimensional code is provided on a tire side surface portion by engraving a predetermined pattern of dot holes on a tire side surface portion (see International Patent Publication No. WO 2005/00714).

At the time of storage of a pneumatic tire (hereinafter, simply referred to as "tire") on which such a two-dimensional code is engraved, tires are stacked or stored in contact with each other in a tire rack. Accordingly, the tires rubbed against each other and thus two-dimensional codes on the tires may blur. Also, two-dimensional codes may be each engraved in a region recessed from a sidewall surface so that the two-dimensional code does not blur even when tires are rubbed with each other. In this case, in order to form a recessed region in a tire mold configured to mold a tire in a predetermined shape by vulcanization, a protruded portion is provided on a mold inner surface of the tire mold, which is contactable with an unvulcanized tire. However, in order to provide the protruded portion, an additional processing is required for the tire mold. However, it is difficult to perform the additional processing on the mold inner surface of the tire mold that has already been used, and it takes more man-hours compared with processing by which a recessed portion is provided in the mold inner surface. Further, for the purpose of weight reduction of a tire, a recessed region is formed in a sidewall portion of a tire having a side rubber member, the thickness of which is reduced, and dot holes are formed in the region and thus a two-dimensional code is engraved. In this case, since the strength of the tire is likely to decrease, such engraving is not preferable.

Furthermore, when the predetermined number of vulcanized tires is manufactured, the tire mold is removed from a vulcanization machine, and cleaning is performed to remove dirt adhered to the mold inner surface by sandblasting. The mold inner surface is likely to be scratched by sandblasting. Consequently, the surface of a tire side surface portion of a sidewall portion and a bead portion of a vulcanized tire manufactured using the tire mold is likely to lose glossiness due to the number of cleaning times of the tire mold. When a two-dimensional code is engraved on such a tire side surface portion, the contrast of a dot pattern identified with two types of gray scale element is reduced, and thus it may be difficult to read the two-dimensional code.

SUMMARY

The present technology provides a method for manufacturing a pneumatic tire, a tire mold, and a pneumatic tire, which can inhibit a reduction in contrast of a two-dimensional code when the two-dimensional code is provided on a tire side surface portion.

One aspect of the present technology is a method for manufacturing for a pneumatic tire. The method includes:
  attaching a replaceable member including a smooth flat surface to a mold body of a tire mold configured to vulcanize an unvulcanized tire into a predetermined shape by contact with the unvulcanized tire, and forming a mold inner surface including a curved surface of the mold body and the flat surface surrounded by the curved surface, the mold inner surface being configured to form shapes of sidewall portions and bead portions of a vulcanized tire;
  vulcanizing the unvulcanized tire by bringing the unvulcanized tire into contact with the mold inner surface and manufacturing a vulcanized tire; and
  manufacturing a pneumatic tire by engraving a two-dimensional code in a planar surface region of at least one of the sidewall portions or the bead portions of the vulcanized tire. The planar surface region corresponds to the flat surface. The two-dimensional code includes a dot pattern formed by two types of gray scale elements formed identifiable from each other by surface unevenness.

The flat surface of the mold inner surface is preferably a surface located inward from a base portion of the curved surface surrounding the flat surface in a direction away from the unvulcanized tire.

In a case where a portion of a side rubber member prior to engraving of the two-dimensional code in which the two-dimensional code of the vulcanized tire is to be engraved has a minimum thickness of 5.8 mm or less, the flat surface is preferably a surface located inward in a direction away from the unvulcanized tire.

The flat surface of the mold inner surface is preferably a surface located outward from a base portion of the curved surface surrounding the flat surface in a direction toward the unvulcanized tire.

In a case where a portion of a side rubber member prior to engraving of the two-dimensional code in which the two-dimensional code of the vulcanized tire is to be engraved has a minimum thickness of greater than 5.8 mm, the flat surface is preferably a surface located outward in a direction toward the unvulcanized tire.

In the vulcanized tire, a shortest distance from the planar surface region of the vulcanized tire to a portion of a carcass cord in the vulcanized tire, which is closest to the planar surface region is preferably 65% or greater of a shortest distance from the base portion to a portion of the carcass cord which is closest to the base portion.

The flat surface is preferably provided so that the planar surface region of the vulcanized tire is inclined with respect to a plane defined by a base portion of the curved surface region surrounding the planar surface region.

Here, one portion of the flat surface is preferably located outward from the base portion in a direction toward the unvulcanized tire, and another portion of the flat surface is preferably an inclined surface inclined with respect to the base portion and located inward in a direction away from the unvulcanized tire.

An outermost surface of the flat surface is preferably provided with a plated layer.

Further, the method preferably includes:
  attaching a plurality of the members to a plurality of locations of the mold body and forming the mold inner surface; and at the time of engraving the two-dimensional code, engraving the two-dimensional code in the planar surface region of the sidewall portion or the bead portion, the planar surface region corresponding to the flat surface in each of the plurality of locations.

The two-dimensional code is preferably engraved by making a plurality of dot holes extending in a direction orthogonal to a plane of the planar surface region.

Another aspect of the present technology is a tire mold configured to vulcanize an unvulcanized tire into a predetermined shape by contact with the unvulcanized tire. The tire mold includes:

a mold body including a contact portion with the unvulcanized tire including a curved surface; and a replaceable member including a contact portion with the unvulcanized tire including a flat surface.

The flat surface is disposed surrounded by the curved surface. The flat surface is located inward from a base portion of the curved surface surrounding the flat surface in a direction away from the unvulcanized tire or is located outward from the base portion in a direction toward the unvulcanized tire.

Also, another aspect of the present technology is a pneumatic tire. The pneumatic tire includes:

a tread portion contactable with a road surface;

sidewall portions provided sandwiching the tread portion on opposite sides in a tire lateral direction; and bead portions connected to the sidewall portions and located inward of the sidewall portions in a tire radial direction.

A surface of at least one of tire side surface portions of the sidewall portions or the bead portions includes:

a curved surface region formed in a curved shape and protruding in the tire radial direction and outward in the tire lateral direction; and a planar surface region disposed surrounded by the curved surface region, the planar surface region being provided with a two-dimensional code in which a dot pattern is formed by two types of gray scale elements formed identifiable from each other by surface unevenness.

The planar surface region is preferably inclined with respect to a reference plane orthogonal to a rotation axis of the pneumatic tire.

An arithmetic mean roughness Ra of the planar surface region is preferably less than an arithmetic mean roughness Ra in a region including a base portion of the curved surface region surrounding the planar surface region.

The surface unevenness is preferably formed by a plurality of dot holes formed in the planar surface region, and the dot holes preferably extend in a direction orthogonal to a plane of the planar surface region.

According to the foregoing method for manufacturing a pneumatic tire, the foregoing tire mold, and the foregoing pneumatic tire, when a two-dimensional code is provided on a tire side surface portion, the contrast of the two-dimensional code can be inhibited from being reduced.

DETAILED DESCRIPTION

A method for manufacturing a pneumatic tire, a tire mold, and a pneumatic tire according to the present embodiment will be herein described in detail.

Definitions

In the specification, "tire lateral direction" is the direction parallel with a rotation axis of a pneumatic tire (referred to as "tire"). An outer side in the tire lateral direction is a side away from a tire centerline CL (see FIG. 1) representing a tire equatorial plane in the tire lateral direction. Also, an inner side in the tire lateral direction is a side closer to the tire centerline CL in the tire lateral direction. A tire circumferential direction is a direction of rotation of the pneumatic tire about the center of the rotation axis. "Tire radial direction" is the direction orthogonal to the rotation axis of the pneumatic tire. "Outward in the tire radial direction" is the direction away from the rotation axis. Similarly, an inner side in the tire radial direction is a side closer to the rotation axis.

A two-dimensional code referred to in the specification is a one-dimensional code that has information only in the lateral direction (a matrix display type code having information in two directions with respect to a bar-code). The two-dimensional code includes, for example, QR Code®, Data Matrix®, MaxiCode®, PDF417®, Code 16K®, Code 49®, Aztec Code®, SP Code®, Vericode®, and CP Code®.

Pneumatic Tire

Figure 1:
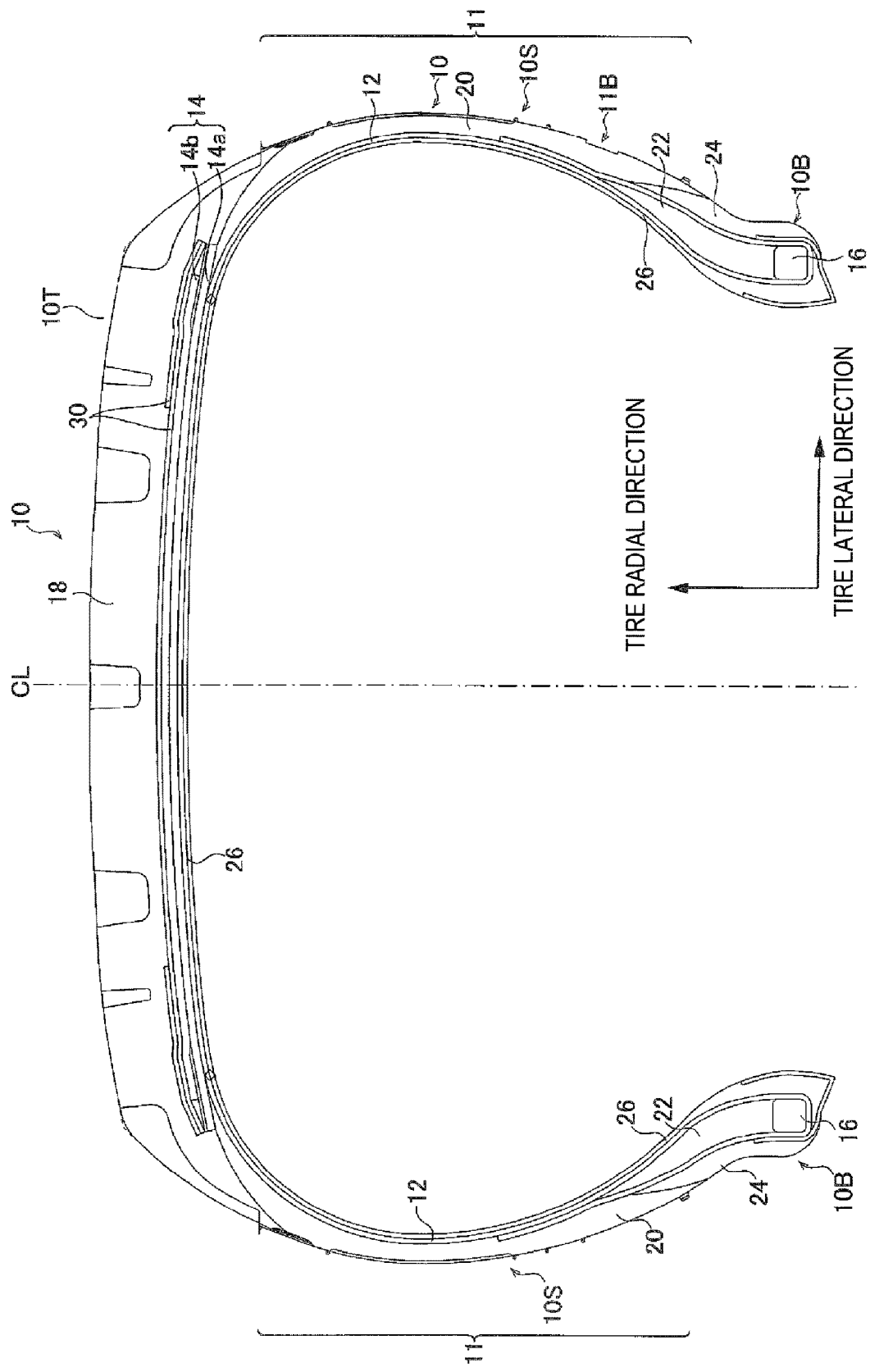
FIG. 1 is a diagram illustrating an example of the configuration of a pneumatic tire according to an embodiment.

FIG. 1 is a diagram illustrating an example of the configuration of a pneumatic tire 10 (hereinafter simply referred to as "tire 10") according to an embodiment.

The tire 10 includes a tread portion 10T including a tread pattern, a pair of bead portions 10B, and a pair of sidewall portions 10S provided at the opposite sides of the tread portion 10T and connected to the pair of bead portions 10B and the tread portion 10T. The tread portion 10T is a portion that comes into contact with a road surface. The sidewall portions 10S are provided sandwiching the tread portion 10T on opposite sides in the tire lateral direction. The bead portion 10B is connected to the sidewall portion 10S and is located inward of the sidewall portion 10S in the tire radial direction.

The tire 10 mainly includes a carcass ply 12, a belt 14, and bead cores 16 as framework members, and the tire 10 mainly includes a tread rubber member 18, side rubber members 20, bead filler rubber members 22, rim cushion rubber members 24, and an innerliner rubber member 26 around the framework members.

The carcass ply 12 includes a carcass ply member that extends in a toroidal shape between a pair of annular bead cores 16 and that is made of organic fibers covered with rubber. The carcass ply 12 is wound around the bead cores 16 and extends outward in the tire radial direction. The belt 14 including two belt members 14a, 14b is provided outward of the carcass ply 12 in the tire radial direction. The belt 14 includes a member made of steel cords that are provided covered with rubber and inclined at a predetermined angle, for example, from 20 to 30 degrees with respect to the tire circumferential direction (the direction orthogonal to the sheet). The width of the belt member 14a, which is a lower layer, in the tire lateral direction is greater than the width of the belt member 14b, which is an upper layer, in the tire lateral direction. The steel cords of the two belt members 14a, 14b are inclined in opposite directions. Thus, the belt members 14a, 14b are crossing layers serving to inhibit the carcass ply 12 from being expanded by pressure of air filled into the tire.

The tread rubber member 18 is disposed outward of the belt layer 14 in the tire radial direction. The side rubber members 20 are connected to opposite ends of the tread rubber member 18, and thus form the sidewall portions 10S. The rim cushion rubber members 24 are provided at the inner ends of the side rubber members 20 in the tire radial direction and come into contact with a rim on which the tire 10 is mounted. The bead filler rubber member 22 is provided outward of the bead core 16 in the tire radial direction so as to be interposed between a portion of the carcass ply 12 which is not wound around the bead core 16 and a portion of the carcass ply 12 which is wound around the bead core 16. The innerliner rubber member 26 is provided on the inner surface of the tire 10 facing a tire cavity region that is filled with air, and is surrounded by the tire 10 and the rim.

In addition, the tire 10 includes a two-layered belt cover 30 made of organic fibers covered with rubber. The belt cover 30 is provided between the belt member 14b and the tread rubber member 18 while covering the belt 14 from the outer side of the belt 14 in the tire radial direction.

A planar surface region 11B is provided on a tire side surface portion 11 of the sidewall portion 10S or the bead portion 10B of the tire 10 as just described. A two-dimensional code 40 described below is engraved in the planar surface region 11B.

Two-Dimensional Code

Figure 2A:
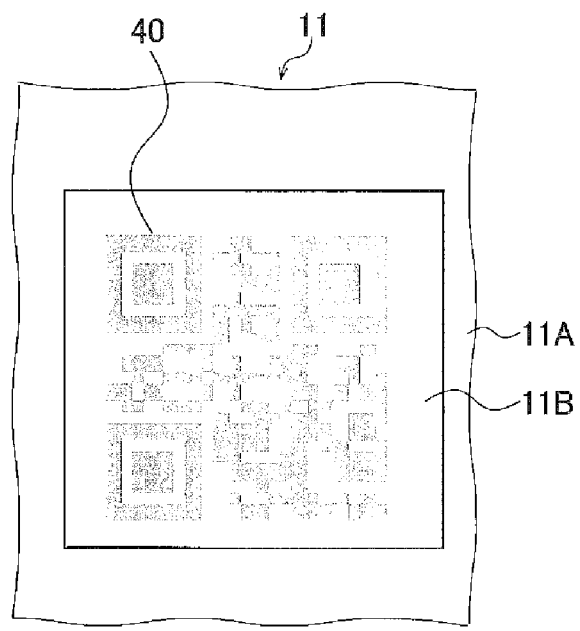
FIGS. 2A and 2B are diagrams each illustrating an example of a two-dimensional code provided on a pneumatic tire according to an embodiment.
Figure 2B:
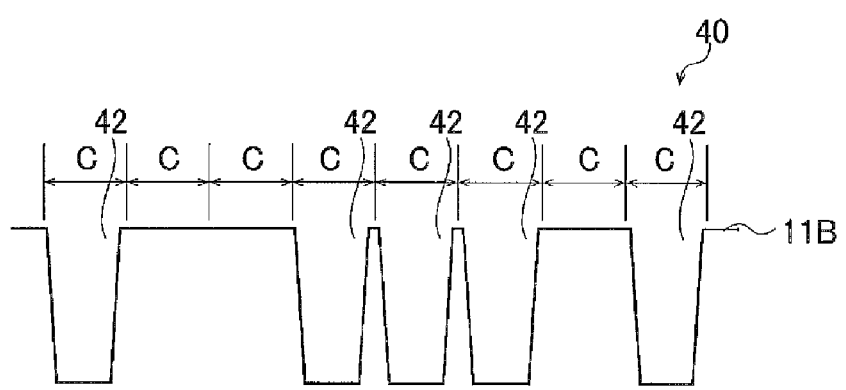

FIGS. 2A and 2B are diagrams each illustrating an example of a two-dimensional code provided on the tire side surface portion 11 including the bead portion 10B and the sidewall portion 10S of the tire 10.

As illustrated in FIG. 2A, the surface of the tire side surface portion 11 includes a curved surface region 11A and the planar surface region 11B.

The curved surface region 11A has a curved shape in which the sidewall portion 10S or the bead portion 10B is protruded outward in the tire lateral direction, and the curved shape extends in the tire circumferential direction while maintaining the same shape.

The planar surface region 11B is a region that defines a plane surrounded by the curved surface region 11A. The planar surface region 11B is located outward (in a direction away from the tire equatorial plane) from a base portion of the curved surface region 11A surrounding the planar surface region 11B in the normal direction of a plane defined by the base portion of the curved surface region 11A, or is located inward (in a direction toward the tire equatorial plane) from the base portion of the curved surface region 11A. Thus, the planar surface region 11B is not flush with the base portion of the curved surface region 11A. The base portion is referred to edges (linear sides) of the curved surface region 11A surrounding the planar surface region 11B. The plane defined by the base portion is referred to as a flat surface or a curved surface that can obtained by smoothly extending the curved surface region 11A within a region surrounded by the base portion.

The two-dimensional code 40 is engraved in the planar surface region 11B. The two-dimensional code 40 has a dot pattern formed by two types of gray scale elements that are formed identifiable from each other by surface unevenness of the planar surface region 11B. The two-dimensional code is structured such that an arrangement region is divided into grids as plural unit cell regions having a rectangular shape (square shape) and the same size and such that the identifiable gray scale elements are formed corresponding to the plural unit cell regions, and thus the dot pattern of the two-dimensional code is formed. As illustrated in FIG. 2B, the two-dimensional code 40 according to an embodiment is structured such that dot holes 42 are each formed in a darkened region (black region in the drawing) of the gray scale elements while corresponding to the unit cell region C forming one of the gray scale elements. In the unit cell region C where the dot hole 42 is formed, light enters the dot hole 42, and there is less component that reflects within the dot hole 42 and reflects outward from the dot hole 42. The unit cell region C where the dot hole 42 is formed is identified as a black region by a viewer compared with the unit cell region C, which is a portion of the planar surface region 11B where the dot hole 42 is not formed. However, when there is small surface unevenness in the unit cell region C where the dot hole 42 is not formed, incident light due to the small surface unevenness diffuses and reflects. Accordingly, the unit cell region C where the dot hole 42 is not formed is easily subject to a reduction in contrast compared with the black unit cell region C where the dot hole 42 is formed. Consequently, an error in reading the two-dimensional code 40 easily occurs. For example, during storage of tires, the tire side surface portions 11 are rubbed with each other and thus the planar surface region 11B is easily scratched. Also, in the case of a tire mold to be used in a manufacturing process of the tire 10, when the predetermined number of vulcanized tires is manufactured, a mold inner surface is cleaned by sandblasting. Accordingly, the tire mold is likely to lose glossiness due to the number of cleaning times of the tire mold. Even when a two-dimensional code is engraved on the tire side surface portion 11 as just described, the two-dimensional code 40 having a strong contrast cannot be provided.

Thus, in the present embodiment, the surface unevenness of the planar surface region 11B prior to engraving the two-dimensional code 40 is less than the surface evenness of the curved surface region 11A. According to an embodiment, an arithmetic mean roughness Ra (JIS (Japanese Industrial Standard) B 0601:2001) of the planar surface region 11B is preferably less than an arithmetic mean roughness Ra of a region including the base of the curved surface region 11A. The arithmetic mean roughness Ra of the planar surface region 11B is, for example, 10 μm or less, and is preferably 5 μm or less. On the other hand, the arithmetic mean roughness Ra of the curved surface region 11A is, for example, from 10 μm to 100 μm, and is preferably from 12 μm to 100 μm.

When an incident light enters the two-dimensional code 40 from one direction, all of the unit cell regions C where the dot holes 42 are not formed can receive the light that is specularly reflected. Accordingly, the contrast between the unit cell region C where the dot hole 42 is not formed and the unit cell region C where the dot hole 42 is formed is increased in the entire region of the two-dimensional code 40, and thus the entire two-dimensional code 40 can be easily read. This is why the surface of the planar surface region 11B is not a curved surface but a flat surface. Consequently, the flat surface of the planar surface region 11B may be oriented to facilitate reading of the two-dimensional code 40. According to an embodiment, the flat surface of the planar surface region 11B may be inclined with respect to a reference flat plane orthogonal to the rotation axis of the tire 10. According to an embodiment, the flat surface of the planar surface region 11B may be parallel or substantially parallel to the plane defined by the base portion of the curved surface region 11A, which surrounds the planar surface region 11B. According to an embodiment, preferably, the flat surface of the planar surface region 11B is not parallel, i.e., is inclined with respect to the plane defined by the aforementioned base portion.

Figure 3A:
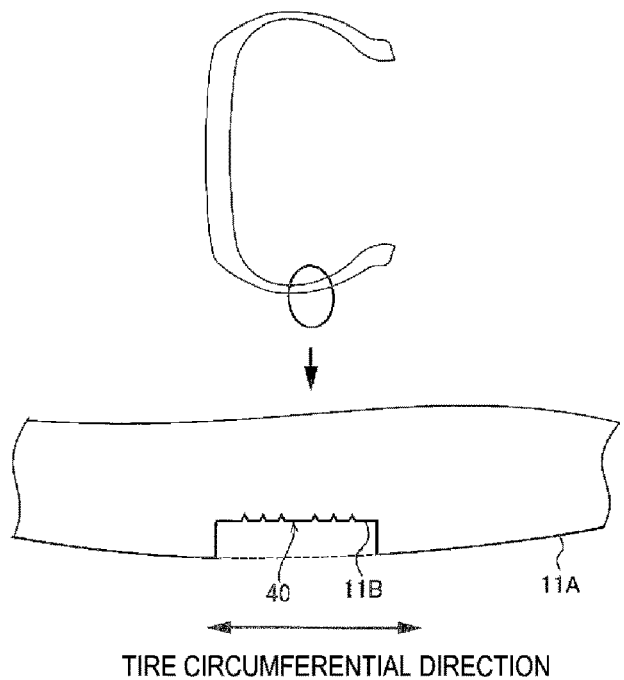
FIG. 3A is an enlarged view of an example of a cross section of a two-dimensional code provided on a pneumatic tire.
Figure 3B:
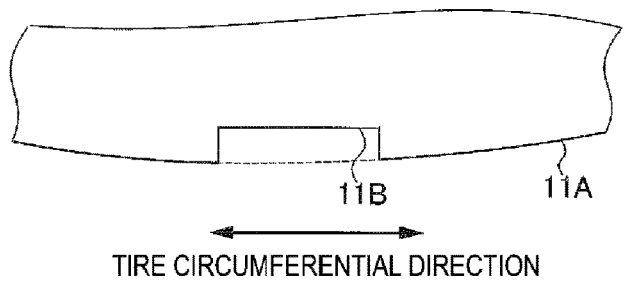
FIG. 3B is an enlarged view illustrating an example of a cross section of a predetermined two-dimensional code arrangement region prior to engraving the two-dimensional code illustrated in FIG. 3A.

FIG. 3A is an enlarged view of an example of a cross section of the two-dimensional code 40 provided on the tire 10. FIG. 3B is an enlarged view illustrating an example of a cross section of a predetermined two-dimensional code arrangement region prior to engraving the two-dimensional code 40 illustrated in FIG. 3A. FIG. 3A is a cross section of the two-dimensional code 40, which is cut along the tire circumferential direction.

In the example illustrated in FIG. 3A, the planar surface region 11B is located inward toward the tire equatorial plane from the base portion of the curved surface region 11A surrounding the planar surface region 11B. Thus, the two-dimensional code 40 is provided at a position inward toward the tire equatorial plane from the base portion of the curved surface region 11A surrounding the planar surface region 11B. As illustrated in FIG. 3B, such a two-dimensional code 40 is obtained by forming a dot pattern as a desired pattern of the dot holes 42 by laser beam irradiation to the planar surface region 11B.

Note that as illustrated in FIG. 2B, the dot hole 42 of the two-dimensional code 40 preferably extends in a direction orthogonal to the plane of the planar surface region 11B. Such a dot hole 42 is provided, and thus, when light enters the dot hole 42, there is less component that reflects outward from the dot hole 42. Consequently, the contrast between the unit cell region C where the dot hole 42 is not formed and the unit cell region C where the dot hole 42 is formed can be increased.

As a result, as just described, the tire side surface portion 11 including the planar surface region 11B located inward from the base portion of the curved surface region 11A can be formed by the tire mold described below.

Tire Mold

The tire mold is a mold configured to heat and vulcanize an unvulcanized tire into a predetermined shape by contact with the unvulcanized tire. The tire mold is mounted into a vulcanization machine (not illustrated), and an unvulcanized tire is vulcanized, and thus a vulcanized tire is produced.

Figure 3C:
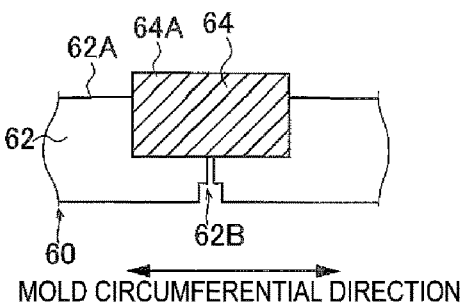
FIG. 3C is an enlarged view illustrating an example of a cross section of a main portion of a tire mold that forms the predetermined two-dimensional code arrangement region illustrated in FIG. 3B.

FIG. 3C is an enlarged view illustrating an example of a cross section of a main portion of a tire mold 60 according to an embodiment.

The tire mold 60 includes a mold body 62 and a member 64.

A portion of the mold body 62, which is contactable with an unvulcanized tire, has a curved surface 62A. In FIG. 3C, the curved surface 62A is illustrated by a straight line.

A portion of the member 64, which is contactable with an unvulcanized tire, has a flat surface 64A having a smooth flat surface. The member 64 is inserted into a recess provided in the mold body 62, and thus is arranged in the mold body 62. The recess of the mold body 62 is formed in a shape matching the shape of the member 64. In the illustrated example, the member 64 is fixed to the mold body 62 by a bolt (not illustrated) extending through a countersunk hole 62B provided on the opposite side of the curved surface 62A. A method for fixing the member 64 is not limited to fixing by a bolt. Alternatively, in addition to mechanical fixing, the member 64 may be fixed by using an adhesive. The member 64 is a replaceable member.

Accordingly, by attaching the member 64 having the flat surface 64A to the mold body 62, a mold inner surface is formed which forms the shape of the tire side surface portion 11 including the curved surface 62A of the mold body 62 and the flat surface 64A surrounded by the curved surface 62A.

Here, the flat surface 64A is located outward in a direction toward the unvulcanized tire from a base portion of the curved surface 62A surrounding the flat surface 64A.

As illustrated in FIG. 3B, by performing vulcanization with the use of the tire mold 60, the tire side surface portion 11 is formed so as to have a shape located inward toward the tire equatorial plane from the base portion of the curved surface region 11A surrounding the planar surface region 11B.

The flat surface 64A of the member 64 is cleaned multiple times by sandblasting, and thus many scratches are made in the flat surface 64A. In such a case, the member 64 is removed from the mold body 62 and replaced with a new member 64. Here, the member 64 is thus a replaceable member. There is no scratch on the flat surface 64A of the new member 64 and the surface unevenness is extremely small. Accordingly, the surface roughness of the planar surface region 11B of the vulcanized tire obtained by vulcanization with the tire mold using the new member 64 is small and the planar surface region B is a glossy surface. Consequently, the two-dimensional code 40 is engraved on the glossy surface, and thus the two-dimensional code 40 having a strong contrast can be formed.

Note that according to an embodiment, the outermost surface of the flat surface 64A is preferably provided with a plated layer. The plated layer is preferably a hard chromium plated layer formed of hard chromium plating. The outermost surface of the flat surface 64A is provided with the plated layer, and thus the flat surface 64A is not easily scratched by sandblasting. Consequently, the frequency of replacing the member 64 can be reduced, and in addition, the glossy planar surface region 11B can be provided.

Figure 4A:
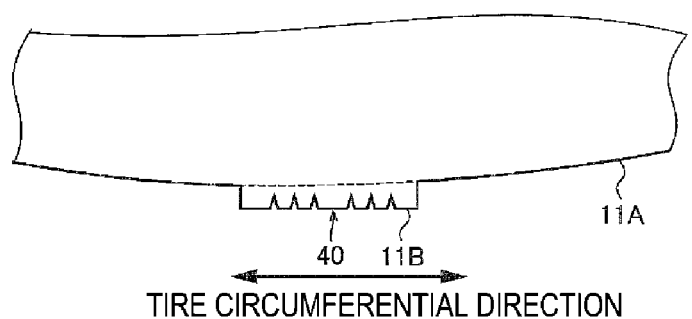
FIG. 4A is an enlarged view of another example of a cross section of a two-dimensional code provided on a pneumatic tire.
Figure 4B:
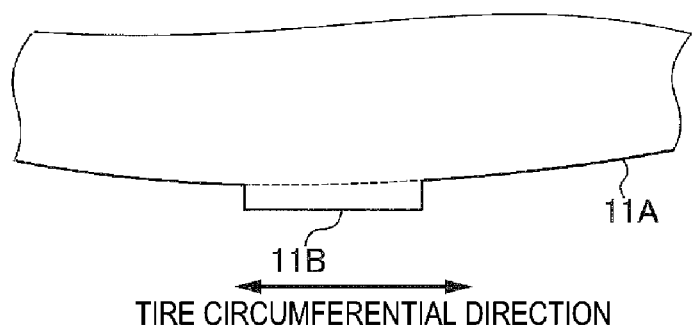
FIG. 4B is an enlarged view illustrating an example of a cross section of a predetermined two-dimensional code arrangement region prior to engraving the two-dimensional code illustrated in FIG. 4A.
Figure 4C:
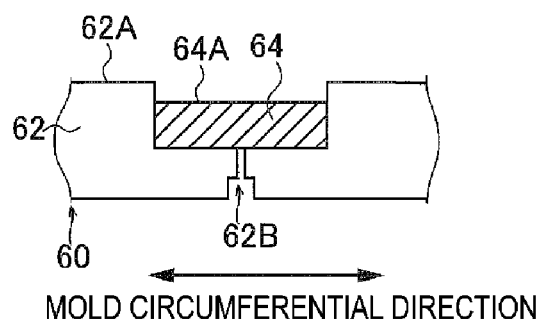
FIG. 4C is an enlarged view illustrating an example of a cross section of a main portion of a tire mold that forms the predetermined two-dimensional code arrangement region illustrated in FIG. 4B.

FIGS. 4A to 4C are diagrams each illustrating an example in which the planar surface region 11B is located outward from the base portion of the curved surface region 11A in a direction away from the tire equatorial plane.

Specifically, FIG. 4A is an enlarged view of an example of a cross section of the two-dimensional code 40 provided on the tire 10. FIG. 4B is an enlarged view illustrating an example of a cross-section of a predetermined two-dimensional code arrangement region prior to engraving the two-dimensional code 40 illustrated in FIG. 4A. FIG. 4C is an enlarged view illustrating an example of a cross section of a main portion of the tire mold 60 that forms the predetermined two-dimensional code arrangement region illustrated in FIG. 4B.

In the examples illustrated in FIGS. 4A and 4B, the planar surface region 11B is located outward from the base portion of the curved surface region 11A in a direction away from the tire equatorial plane. As illustrated in FIG. 4C, the tire mold 60 forming a tire having such a shape is designed such that the flat surface 64A is located inward in a direction away from the unvulcanized tire from the base portion of the curved surface 62A surrounding the flat surface 64A.

Even with the use of such a tire mold 60, when the flat surface 64A of the member 64 is cleaned multiple times by sandblasting and many scratches are made in the flat surface 64A, the member 64 can be removed from the mold body 62 and can be replaced with a new member 64. Consequently, since the two-dimensional code 40 is engraved on the glossy surface, the two-dimensional code 40 having a strong contrast can be formed.

Figure 5A:
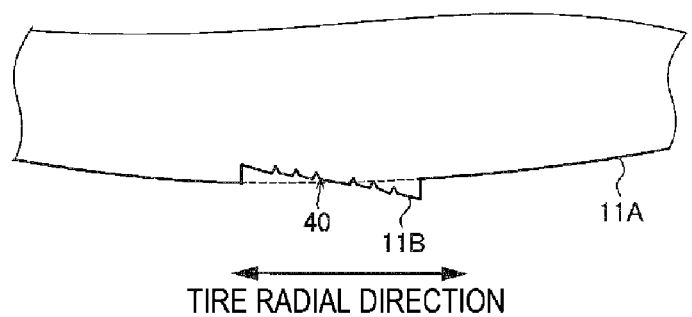
FIG. 5A is an enlarged view of still another example of a cross section of a two-dimensional code provided on a pneumatic tire.
Figure 5B:
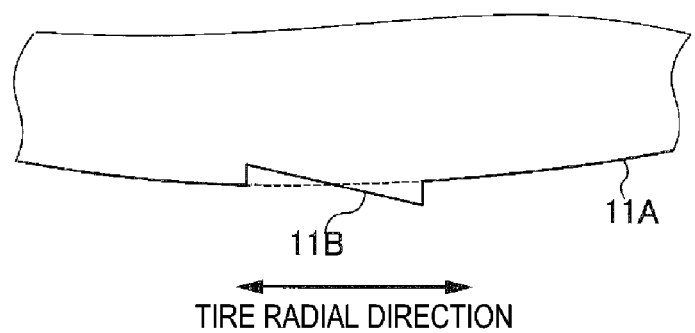
FIG. 5B is an enlarged view illustrating an example of a cross section of a predetermined two-dimensional code arrangement region before the two-dimensional code illustrated in FIG. 5A is engraved.
Figure 5C:
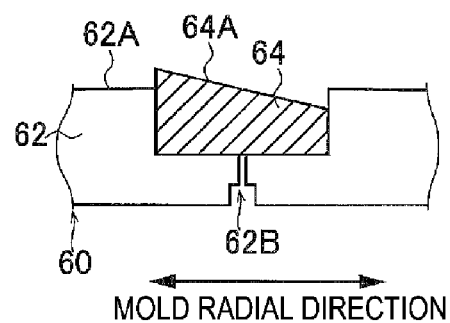
FIG. 5C is an enlarged view illustrating an example of a cross section of a main portion of a tire mold that forms the predetermined two-dimensional code arrangement region illustrated in FIG. 5B.

FIGS. 5A to 5C are diagrams each illustrating an example in which the planar surface region 11B is a flat surface but is inclined with respect to the plane formed by the base portion of the curved surface region 11A.

Specifically, FIG. 5A is an enlarged view of an example of a cross section of the two-dimensional code 40 provided on the tire 10. FIG. 5B is an enlarged view illustrating an example of a cross section of a predetermined two-dimensional code arrangement region prior to engraving the two-dimensional code 40 illustrated in FIG. 5A. FIG. 5C is an enlarged view illustrating an example of a cross section of a main portion of the tire mold 60 that forms the predetermined two-dimensional code arrangement region illustrated in FIG. 5B.

In the examples illustrated in FIGS. 5A and 5B, one end of the planar surface region 11B in the tire radial direction is located outward from the base portion of the curved surface region 11A in a direction away from the tire equatorial plane, and the other end of the planar surface region 11B in the tire radial direction is located inward from the base portion of the curved surface region 11A in a direction toward the tire equatorial plane. In the tire mold 60 forming a tire having such a shape, one end of the flat surface 64A in a mold radial direction corresponding to the tire radial direction is located inward in a direction away from the unvulcanized tire from the base portion of the curved surface 62A surrounding the flat surface 64A. The other end of the flat surface 64A in the mold radial direction is located outward in a direction toward the unvulcanized tire from the base portion of the curved surface 62A surrounding the flat surface 64A.

As just described, the planar surface region 11B and the flat surface 64A are inclined with respect to the plane defined by the base portion. The inclined planar surface region 11B is provided as just described, and thus the two-dimensional code 40 having a strong contrast in a particular direction can be formed. Consequently, reading of the two-dimensional code 40 can be facilitated.

Note that in FIGS. 5A to 5C, the planar surface region 11B is inclined, in the tire radial direction, with respect to the plane defined by the base portion of the curved surface 62A. Alternatively, the planar surface region 11B may be inclined, in the tire circumferential direction, with respect to the plane defined by the base portion. Additionally, the inclined planar surface region 11B may have a shape such that any portion is located inward from the base portion of the curved surface region 11A toward the tire equatorial plane, or may have a shape such that any portion is located outward from the base portion of the curved surface region 11A in a direction away from the tire equatorial plane.

Method for Manufacturing Pneumatic Tire

Such a tire 10 can be manufactured by using the tire mold 60 as follows.

(1) First, a cylindrical unvulcanized tire in which an unvulcanized innerliner rubber member, the carcass ply 12, the bead cores 16, the belt 14, an unvulcanized tread rubber member, unvulcanized side rubber members, unvulcanized bead filler rubbers, unvulcanized rim cushion rubbers, and the like are stacked in predetermined positions is molded.

(2) The molded unvulcanized tire is vulcanized by contact with the mold inner surface of the tire mold 60, and thus the vulcanized tire is produced. At this time, as illustrated in FIG. 3C, 4C, or 5C, the replaceable member 64 having the flat surface 64A is attached to the mold body 62 of the tire mold 60 configured to vulcanize the unvulcanized tire into a predetermined shape. Thus, the mold inner surface that includes the curved surface 62A of the mold body 62 and the flat surface 64A surrounded by the curved surface 62A and that forms the shapes of sidewall portions and bead portions of the vulcanized tire is formed.

(3) The unvulcanized tire is vulcanized by contact with the mold inner surface, and thus the vulcanized tire is produced.

(4) In the planar surface region 11B corresponding to the flat surface 64A of the produced vulcanized tire, a dot pattern is formed by two types of gray scale elements formed identifiable from each other by the surface unevenness, and thus the two-dimensional code 40 is engraved. As a result, the pneumatic tire 10 is manufactured. Specifically, a dot pattern is formed in a desired dot pattern of dot holes by irradiating the planar surface region 11B with a laser beam, and engraving is performed in this manner.

At this time, according to an embodiment, as illustrated in FIG. 4C, in the mold inner surface, the flat surface 64A is preferably a surface located inward in a direction away from the unvulcanized tire from the base portion of the curved surface 62A surrounding the flat surface 64A. In a case where such a flat surface 64A is provided, a portion of the side rubber member prior to engraving in which the two-dimensional code 40 of the vulcanized tire is to be engraved has a minimum thickness of 5.8 mm or less. The minimum thickness of the side rubber member of the vulcanized tire can be estimated in advance from target design dimensions. In a case where the minimum thickness is out of the above range, the flat surface 64A is a surface located inward in a direction away from the unvulcanized tire from the base portion of the curved surface 62A. Accordingly, the planar surface region 11B of the tire side surface portion 11 is shaped to be located outward from the base portion of the curved surface region 11A. Consequently, the side rubber member becomes thicker than necessary and the weight of the side rubber member unnecessarily increases, which is not preferable in terms of uniformity and load balance.

According to an embodiment, the two-dimensional code 40 is preferably engraved by making the plural dot holes 42 extending in a direction orthogonal to the plane of the planar surface region 11B. The direction of depth of the dot hole 42 is set as the direction orthogonal to the plane of the planar surface region 11B. Accordingly, when light enters the dot hole 42, there is less component that reflects outward from the dot hole 42. Consequently, the contrast between the unit cell region C where the dot hole 42 is not formed and the unit cell region C where the dot hole 42 is formed can be increased.

According to another embodiment, as illustrated in FIG. 3C, the flat surface 64A is preferably a surface located outward in a direction toward the unvulcanized tire from the base portion of the curved surface 62A surrounding the flat surface 64A. The configuration where such a flat surface 64A is provided is preferably limited to a case where, prior to engraving, the minimum thickness of the side rubber member in the curved surface region 11A of the vulcanized tire, which corresponds to the curved surface 62A is greater than 5.8 mm. The minimum thickness of the side rubber member of the vulcanized tire can be estimated in advance from target design dimensions. In a case where the minimum thickness is out of the above range, the flat surface 64A is located outward in a direction toward the unvulcanized tire from the base portion of the curved surface 62A. Accordingly, the thickness of the side rubber member in the planar surface region 11B of the tire side surface portion 11 cannot be sufficiently ensured, which is not preferable for tire characteristics.

In this case, in the vulcanized tire, the shortest distance from the planar surface region 11B of the vulcanized tire to a portion of the carcass cord in the vulcanized tire, which is closest to the planar surface region 11B is preferably 65% or greater of the shortest distance from the base portion of the curved surface region 11A to a portion of the carcass cord, which is closest to the base portion of the curved surface region 11A. As a result, the thickness of the side rubber member that allows the side rubber member to exert functions on the tire characteristics can be secured.

According to another embodiment, as illustrated in FIG. 5B, the flat surface 64A is also preferably provided so that the planar surface region 11B of the vulcanized tire is inclined with respect to the plane defined by the base portion of the curved surface region 11A surrounding the planar surface region 11B.

In this case, as illustrated in FIG. 5C, the flat surface 64A of the tire mold 60 is also preferably designed such that one portion of the flat surface 64A is located outward in a direction toward the unvulcanized tire from the base portion of the curved surface 62A surrounding the flat surface 64A and such that the other portion of the flat surface 64A is located inward in a direction away from the unvulcanized tire from the base portion of the curved surface 62A surrounding the flat surface 64A.

Also, according to another embodiment, the outermost surface of the flat surface 64A is preferably provided with a plated layer. Thus, the flat surface 64A is unlikely to be scratched by cleaning by sandblasting. Consequently, the frequency of replacement of the member 64 can be inhibited.

In the present embodiment, the single member 64 is provided, and the single planar surface region 11B is provided on the tire 10, and thus the two-dimensional code 40 is provided in one location on the tire side surface portion 11. However, according to another embodiment, in addition to the member 64, another replaceable member 64 having a flat surface is attached to the mold body 62. Accordingly, the mold inner surface including the curved surface 62A and the flat surface 64A of the mold body 62, and the flat surface of the another member is formed. Thus, the two-dimensional codes 40 are preferably engraved in two planar surface regions corresponding to the flat surface 64A of the member 64 and the flat surface of the another member. During storage of the tire 10, the tire side surface portions 11 are rubbed with each other and thus the contrast of one of the two-dimensional codes 40 is reduced, which causes a difficulty in reading the two-dimensional code 40. Even in such a case, the other of the two-dimensional codes 40 can be often read.

As described above, a method for manufacturing a pneumatic tire, a tire mold, and a pneumatic tire according to the present technology are described in detail; however, the present technology is not limited to the foregoing embodiments. It will be understood that various modification or changes may be made to the present technology without departing from the scope of the present technology.

The invention claimed is:

1. A method for manufacturing a pneumatic tire, the method comprising:
   attaching a replaceable member including a smooth flat surface to a mold body of a tire mold configured to vulcanize an unvulcanized tire into a predetermined shape by contact with the unvulcanized tire, and forming a mold inner surface including a curved surface of the mold body and the flat surface surrounded by the curved surface, the mold inner surface being configured to form shapes of sidewall portions and bead portions of a vulcanized tire, the replaceable member being inserted into a recess provided in the mold body, both the replaceable member and the recess are rectangular in shape;
   vulcanizing the unvulcanized tire by bringing the unvulcanized tire into contact with the mold inner surface and manufacturing a vulcanized tire; and
   manufacturing a pneumatic tire by engraving a two-dimensional code in a planar surface region of at least one of the sidewall portions or the bead portions of the vulcanized tire after the vulcanizing, the planar surface region corresponding to the flat surface, the two-dimensional code including a dot pattern formed by two types of gray scale elements formed identifiable from each other by surface unevenness.

2. The method for manufacturing a pneumatic tire according to claim 1, wherein the flat surface of the mold inner surface is a surface located inward from a base portion of the curved surface surrounding the flat surface in a direction away from the unvulcanized tire.

3. The method for manufacturing a pneumatic tire according to claim 1, wherein in a case where a portion of a side rubber member prior to engraving of the two-dimensional code, in which the two-dimensional code of the vulcanized tire is to be engraved, has a minimum thickness of 5.8 mm or less, the flat surface is a surface located inward in a direction away from the unvulcanized tire.

4. The method for manufacturing a pneumatic tire according to claim 1, wherein the flat surface of the mold inner surface is a surface located outward from a base portion of the curved surface surrounding the flat surface in a direction toward the unvulcanized tire.

5. The method for manufacturing a pneumatic tire according to claim 4, wherein in the vulcanized tire, a shortest distance from the planar surface region of the vulcanized tire to a portion of a carcass cord in the vulcanized tire, which is closest to the planar surface region is 65% or greater of a shortest distance from the base portion to a portion of the carcass cord which is closest to the base portion.

6. The method for manufacturing a pneumatic tire according to claim 1, wherein in a case where a portion of a side rubber member prior to engraving the two-dimensional code in which the two-dimensional code of the vulcanized tire is to be engraved has a minimum thickness of greater than 5.8 mm, the flat surface is a surface located outward in a direction toward the unvulcanized tire.

7. The method for manufacturing a pneumatic tire according to claim 1, wherein the flat surface is provided so that the planar surface region of the vulcanized tire is inclined with respect to a plane defined by a base portion of the curved surface region surrounding the planar surface region.

8. The method for manufacturing a pneumatic tire according to claim 7,
wherein the flat surface is an inclined surface inclined with respect to the base portion,
wherein one portion of the flat surface is located outward from the base portion in a direction toward the unvulcanized tire, and
wherein another portion of the flat surface is located inward in a direction away from the unvulcanized tire.

9. The method for manufacturing a pneumatic tire according to claim 1, wherein an outermost surface of the flat surface is provided with a plated layer.

10. The method for manufacturing a pneumatic tire according to claim 1, comprising:
attaching a plurality of the members to a plurality of locations of the mold body and forming the mold inner surface; and
at the time of engraving the two-dimensional code, engraving the two-dimensional code in the planar surface region of the sidewall portion or the bead portion, the planar surface region corresponding to the flat surface in each of the plurality of locations.

11. The method for manufacturing a pneumatic tire according to claim 1, wherein the two-dimensional code is engraved by making a plurality of dot holes extending in a direction orthogonal to a plane of the planar surface region.

12. The method for manufacturing a pneumatic tire according to claim 1, wherein the planar surface region is located within an imaginary plane, and the imaginary plane is different from a plane defined by smoothly extending the curved surface region.

13. The method for manufacturing a pneumatic tire according to claim 1, further comprising mechanically attaching the replaceable member into the recess using a fastener.

14. The method for manufacturing a pneumatic tire according to claim 1, further comprising adhesively fixing the replaceable member into the recess.

15. The method for manufacturing a pneumatic tire according to claim 1, wherein both the replaceable member and the recess are rectangular in shape in view from a direction perpendicular to the smooth flat surface.

16. A tire mold configured to vulcanize an unvulcanized tire into a predetermined shape by contact with the unvulcanized tire, the tire mold comprising:
a mold body including a contact portion configured to contact the unvulcanized tire and including a curved surface; and
a replaceable member attached to the mold body and including a contact portion configured to contact the unvulcanized tire, the contact portion including a flat surface disposed surrounded by the curved surface, the flat surface being located inward from a base portion of the curved surface surrounding the flat surface in a direction away from the unvulcanized tire or being located outward from the base portion in a direction toward the unvulcanized tire, the replaceable member being inserted into a recess provided in the mold body, wherein the recess is rectangular in shape.

17. A method for manufacturing a pneumatic tire, the method comprising:
attaching a replaceable member including a smooth flat surface to a mold body of a tire mold configured to vulcanize an unvulcanized tire into a predetermined shape by contact with the unvulcanized tire, and forming a mold inner surface including a curved surface of the mold body and the flat surface surrounded by the curved surface, the mold inner surface being configured to form shapes of sidewall portions and bead portions of a vulcanized tire, the replaceable member being inserted into a recess provided in the mold body, the replaceable member being fixed adhesively into the recess;
vulcanizing the unvulcanized tire by bringing the unvulcanized tire into contact with the mold inner surface and manufacturing a vulcanized tire; and
manufacturing a pneumatic tire by engraving a two-dimensional code in a planar surface region of at least one of the sidewall portions or the bead portions of the vulcanized tire after the vulcanizing, the planar surface region corresponding to the flat surface, the two-dimensional code including a dot pattern formed by two types of gray scale elements formed identifiable from each other by surface unevenness.

* * * * *